350-345 SR
1/6/81 OR 4,243,303

United States Patent [19] [11] 4,243,303
Enomoto et al. [45] Jan. 6, 1981

[54] DISPLAY DEVICE FOR ELECTRONIC TIMEPIECES

[75] Inventors: Tadao Enomoto, Higashimurayama; Nobuo Ito, Tokyo, both of Japan

[73] Assignee: Citizen Watch Co., Ltd., Tokyo, Japan

[21] Appl. No.: 16,570

[22] Filed: Mar. 1, 1979

[30] Foreign Application Priority Data

Mar. 2, 1978 [JP] Japan ................................ 53-23951

[51] Int. Cl.[3] .............................................. G02F 1/133
[52] U.S. Cl. .................................... 350/345; 250/462
[58] Field of Search ......................... 350/345; 250/462

[56] References Cited

U.S. PATENT DOCUMENTS

| | | | |
|---|---|---|---|
| 4,104,627 | 8/1978 | Thuler | 350/345 X |
| 4,126,384 | 11/1978 | Goodman et al. | 350/345 |

*Primary Examiner*—Edward S. Bauer
*Attorney, Agent, or Firm*—Birch, Stewart, Kolasch and Birch

[57] ABSTRACT

An illuminating device provided adjacent the liquid crystal display device of an electronic timepiece having a light emitting element composed of tritium ($^3H$). The light emitting element is sealed with a resin without hydrogen atoms, such as chlorotrifluoroethylene resin or polytetrafluoroethylene for preventing the leakage of 3H of tritium.

9 Claims, 4 Drawing Figures

DISPLAY DEVICE FOR ELECTRONIC TIMEPIECES

BACKGROUND OF THE INVENTION

The present invention relates to an illuminating device for the liquid crystal display device of electronic timepiece.

There has been provided an illuminating device comprising a light emitting material which effects without a voltage supply. The light emitting material is selected from radioactive materials such as promethium 147 ($^{147}Pm$), tritium ($^{3}H$) and the like. Such a radioactive material is mixed with suitable cementing material to form a light emitting paint or element. The light emitting element is coated with a transparent resin. Tritium is preferable to the light emitting element, since it has a long lifetime of which the half-life is about 12 years longer than promethium 147. However, in the light emitting element composed of tritium, difficult problems arise in the practical use thereof. More particularly, the constituents $^{3}H$ atoms of tritium leak owing to the substitution thereof with H atoms in the hydrocarbonaceous resin coating, so that luminance of the element is decreased and besides there is a danger to the human body.

SUMMARY OF THE INVENTION

An object of the present invention is to provide a safe illuminating device in which leakage of $^{3}H$ atoms is prevented and of which the lifetime thereof may be increased.

In accordance with the present invention, the illuminating device is characterized in that the light emitting element composed of tritium is sealed with a resin without hydrogen atoms, such as chlorotrifluoroethylene resin or polytetrafluoroethylene $(CF_4)n$.

These and other objects and features of the present invention will become fully apparent from the following detailed description in conjunction with the accompanying drawings.

DESCRIPTION OF THE PREFERRED EMBODIMENTS

Figure 1:
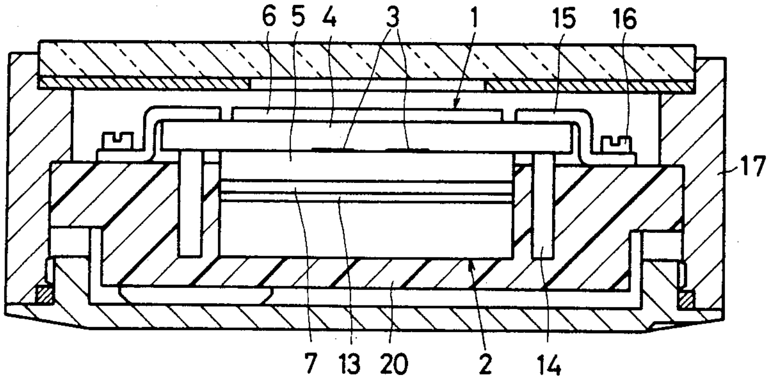
FIG. 1 is a sectional view of an electronic timepiece in which an illuminating device of the present invention is applied.
Figure 2:
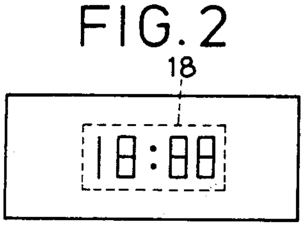
FIG. 2 is a plan view showing the illuminating device.
Figure 3:
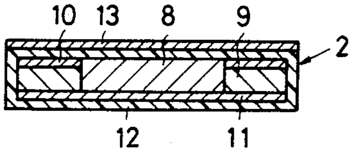
FIG. 3 is a sectional view of the illuminating device.

Referring to the drawings and more particularly to FIGS. 1 to 3, 1 is a liquid crystal display device under which an illuminating device 2 of the present invention is provided adjacent the underside of the device. The liquid crystal display device 1 comprises a liquid crystal cell comprising a pair of glasses 4 and 5, and display segments 3 of liquid crystal material interposed between the glasses and a pair of upper and lower polarizing plates 6 and 7 disposed adjacent the glasses 4 and 5 respectively. The illuminating device 2 comprises a light emitting element 8 composed of tritium ($^{3}H$) and cementing material. The light emitting element 8 is positioned under the display segments 3 and enclosed by a sealing member 9 made of transparent resin without H atom, such as chlorotrifluoroethylene resin or polytetrafluoroethylene. On the light emitting element 8, a light storing layer 10 such as luminous paint is provided and a back plate 11 made of aluminum or titanium is provided under the light emitting element and the sealing member 9. These members are covered by a sealing member 12 made of transparent resin without H atom of same material as the sealing member 9. Further, on the illuminating device, a light storing layer in white 13 is provided.

The liquid crystal display device 1 and the illuminating device 2 are disposed in the recess of a module 20 of the electronic timepiece. The glass 4 is put on conductive rubber supports 14 for applying the voltage to the liquid crystal display device and secured to the module by means of a frame 15 and screws 16. The module 20 is secured to a watch case 17 by well known means.

Thus, the liquid crystal display device 1 is lightened by the light emitted from the element 8 in the illuminating device 2, whereby display by means of segments 3 of the liquid display device 1 may be observed in the night. Further, since the light storing layer 10 emits the light to illuminate the whole of the liquid crystal display device, the display may be clearly seen. On the other hand, the white light storing layer 13 brightens in white in the daytime, so that the display may be easily observed. In addition, the add or unsightly maginal line 18 between the light emitting element 8 and sealing member 9 disappears by the light of the white light storing layer 13.

Figure 4:
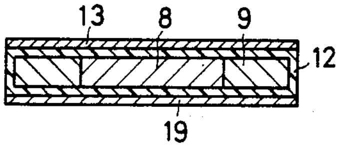
FIG. 4 is a sectional view showing another embodiment of the present invention.

FIG. 4 shows another embodiment of the present invention, in which same parts as the previous embodiment are identified by same numerals as the previous one. In the illuminating device of this embodiment, the light storing layer 10 and the back plate 11 are omitted and a white paint layer 19 such as titanium white is painted on the underside for the purpose of the enhancement of illumination effect. This illuminating device also has the same effect as the previous embodiment.

From the foregoing it will be understood that since the light emitting element of tritium is sealed by a resin without H atom, leakage of $^{3}H$ atoms of tritium may be prevented, whereby it is possible to elongate the lifetime of the light emitting element and to heighten the safety of the illuminating device.

What is claimed is:

1. A display device for electronic timepieces comprising a liquid crystal display device and an illuminating device provided adjacent said liquid crystal display, said illuminating device comprising a light emitting element including tritium and a sealing member made of resin without hydrogen atoms for sealing said light emitting element.

2. A display device for electronic timepieces comprising: a liquid crystal display device, and an illuminating device disposed under said liquid crystal display device, said illuminating device comprising a light emitting element including tritium disposed under display segments in said liquid crystal display device, a first sealing member enclosing said light emitting element, and a second sealing member for sealing the whole of said illuminating device, said first and second sealing members comprising transparent resin without hydrogen atoms.

3. A display device for electronic timepieces comprising: a liquid crystal display device and an illuminating device disposed under said liquid crystal display device, said illuminating device comprising a light emitting element including tritium disposed under display segments in said liquid crystal display device, a first sealing member enclosing said light emitting element, a light storing layer provided on said sealing member, and a second sealing member for sealing the whole of said illuminating device, said first and second sealing members comprising transparent resin without hydrogen atoms.

4. A display device for electronic timepieces according to claim 1 in which said sealing member is made of chlorotrifluoroethylene.

5. A display device for electronic timepieces according to claim 1 in which said sealing member is made of polytetrafluoroethylene.

6. A display device for electronic timepieces according to claim 2 in which said illuminating device includes a back plate.

7. A display device for electronic timepieces according to claim 2 in which said illuminating device includes a white paint layer at the underside thereof.

8. A display device for electronic timepieces comprising: a liquid crystal display device, an illuminating device disposed under said liquid crystal display device, and a light storing layer provided on said illuminating device, said illuminating device comprising a light emitting element including tritium disposed under display segments in said liquid crystal display device, a first sealing member enclosing said light emitting element, and a second sealing member for sealing the whole of said illuminating device, said first and second sealing members comprising transparent resin without hydrogen atoms.

9. A display device for electronic timepieces comprising: a liquid crystal display device, an illuminating device disposed under said liquid crystal display device, and a light storing layer provided on said illuminating device, said illuminating device comprising a light emitting element including tritium disposed under display segments in said liquid crystal display device, a first sealing member enclosing said light emitting element, a light storing layer provided on said sealing member, and a second sealing member for sealing the whole of illuminating device, said first and second sealing members comprising resin without hydrogen atoms.

* * * * *